F. HICKENLOOPER.
HACK SAW HOLDER.
APPLICATION FILED AUG. 22, 1921.
1,420,484. Patented June 20, 1922.
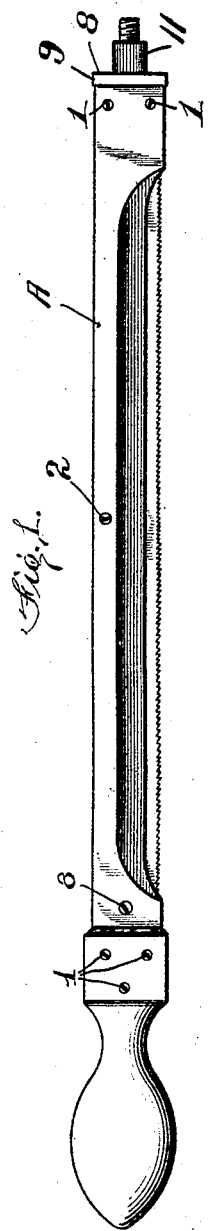
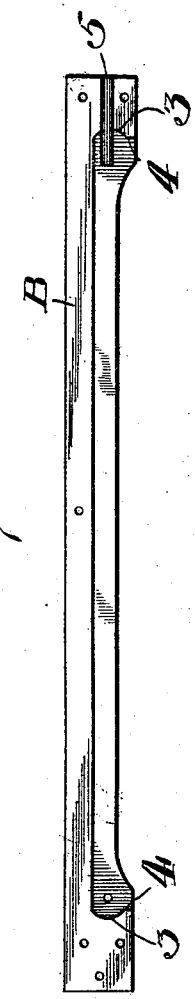
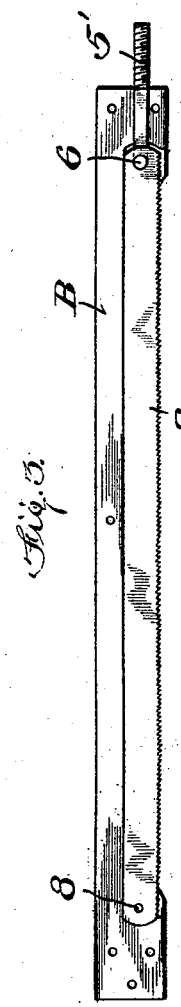
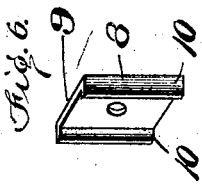
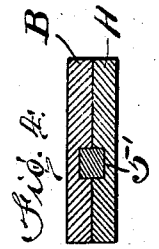
Inventor
Frank Hickenlooper

UNITED STATES PATENT OFFICE.

FRANK HICKENLOOPER, OF ALBIA, IOWA.

HACK-SAW HOLDER.

1,420,484.         Specification of Letters Patent.    Patented June 20, 1922.

Application filed August 22, 1921. Serial No. 494,919.

*To all whom it may concern:*

Be it known that I, FRANK HICKENLOOPER, a citizen of the United States, and a resident of Albia, in the county of Monroe and State of Iowa, have invented a new and Improved Hack-Saw Holder, of which the following is a full and exact description.

My invention relates to hack-saws, and particularly to an improved form of frame or holder; the design of which is to afford protection to, and impart added stability to saw-blades used in connection therewith.

One of the principal objects of my invention is to provide a holder or frame which will hold a saw blade absolutely rigidly so as to resist all vibration while in action, and which will permit the operator to bear down heavily to increase its cutting power.

My improved holder is illustrated in the accompanying drawings, in which—

Figures 1, 2, and 3 are elevations respectively of the entire saw holder with the saw in place; of one half or section of the saw holder with the saw removed; and, of such a half or section with the saw in place.

Fig. 4 is a cross section of the tensioning end of the saw holder.

Fig. 5 is a cross section through the middle of the saw holder, and

Fig. 6 is a perspective view of a cap plate for the tensioning end of the holder.

As shown the saw holder comprises two longitudinal flat bars A and B placed face to face and secured by transverse screws 1, 1, at the ends and beyond the end of the blade which is to be held thereby, and also an intermediate screw 2 near one longitudinal edge of said bars. In the face of one of said bars B is formed a recess of approximately the width and length of a saw blade, opening out through one edge of said bar so that when the saw blade is laid therein the toothed edge may project throughout its length through said opening, while the back of the blade engages the rear wall of said recess. The ends 3 of said recess are shaped in an arc of approximately the form of the ends of the ordinary hack saw blade, although there may be a straight portion 4 connecting the open edge with one end of the arc. From one end of said recess a channel 5, preferably rectangular in cross section, extends through the end of the bar and is intended to receive a threaded rod 5' having a pin 6 to engage an eye of said blade, and which rod throughout the portion thereof which engages said channel being preferably rectangular in cross section. The saw 7 is secured in place not only by the pin 6 on said threaded rod 5' but also by a pin or screw 8 through the other eye extending through either or both bars and also by the positioning of the second bar upon the first so as to close the recess and to enclose the saw, leaving only the toothed edge projecting therefrom. This bar may also have a rectangular channel to receive the tensioning bar. The holder is cut away at the open side of the recess for nearly the length of the latter, and each bar is beveled on its outer face toward the open edge of said recess or the toothed edge of the saw when it is placed therein, such beveling reducing the width of each bar substantially throughout the toothed edge of the saw so that the edge of a saw which is narrower than the greatest width of said recess is yet exposed substantially throughout its length.

While I contemplate that the blade used shall be substantially the length of said recess it is obvious that a shorter blade may be used by appropriate adjustment of the threaded saw tensioning means. The bars are further secured together by a plate 9 applied across the tensioning end of the holder with its edges 10 turned down to form flanges on the outer side of each of said bars and having a central perforation to receive the pin-carrying, screw-threaded, tensioning rod. A nut 11 is threaded upon such rod and bears upon said plate so as to impart the desired tension to the saw and at the same time to hold the plate in position so that its flanges assist in maintaining the inner faces of said bars in contact with each other.

I claim:

1. A rigid saw blade holder comprising a pair of bars secured together face to face and one of them, having a recess open at one edge of the bar to receive the saw blade between them, one edge of said holder being cut away for nearly the length of the recess to expose a greater width of the blade than is exposed at the end portions of the holder and the outer faces of said bars at the cut-away portion being beveled toward the opening of the recess.

2. A rigid saw blade holder comprising a pair of bars secured together face to face and one of them, having a recess open at one edge of the bar to receive the saw blade between them, one edge of said holder being cut away for nearly the length of the recess to expose a greater width of the blade than is exposed at the end portions of the holder and the outer faces of said bars at the cutaway portion being beveled toward the opening of the recess, there being a channel extending from one end of said recess through the end of said bar to receive a tensioning rod for the blade.

3. A rigid saw blade holder comprising a pair of bars secured together face to face and one of them, having a recess open at one edge of the bar to receive the saw blade between them, one edge of said holder being cut away for nearly the length of the recess to expose a greater width of the blade than is exposed at the end portions of the holder and the outer faces of said bars at the cutaway portion being beveled toward the opening of the recess, in combination with a plate fitted across the end of said holder with flanges overlying the two bars and perforated for said tensioning bar.

In testimony whereof, I hereunto affix my signature, this 10th day of August, 1921.

FRANK HICKENLOOPER.

Witnesses:
ERNST H. EISEMAN,
CALVIN KOONTZ.